UNITED STATES PATENT OFFICE.

CUSHING ADAMS, OF BELLOWS FALLS, VERMONT.

OLEAGINOUS COMPOUND.

SPECIFICATION forming part of Letters Patent No. 709,291, dated September 16, 1902.

Application filed June 7, 1901. Serial No. 63,591. (No specimens.)

*To all whom it may concern:*

Be it known that I, CUSHING ADAMS, a citizen of the United States, residing at Bellows Falls, in the county of Windham and State of Vermont, have invented certain new and useful Improvements in Oleaginous Compounds and Processes of Producing Same, of which the following is a specification.

It is a well-known fact that many processes have been adopted for solidifying vegetable oils for commercial products. An example of these methods is that of thickening cotton-seed oil by the use of stearin. There are, however, many disadvantages connected with the methods which are at present commercially used, both as to the want of stability of the product as well as the excessive cost of the same.

This invention or discovery has for its object to produce a novel solidified or semisolidified product suitable for commercial purposes, which may be produced without excessive cost, which may have, for example, the appearance of fine lard, and which by practical tests has been found to be an excellent substitute for the same, this result being based on a discovery which I have made relative to the use of certain casein compositions with vegetable oils.

In carrying my invention or discovery for thickening and solidifying vegetable oils into effect I gradually add, with constant agitation, an alkaline or other casein solution mixed with water to the oil to be thickened and solidified.

To enable those skilled in the art to practice my invention or discovery, the following is an example of the manner in which the same may be carried into effect: To one hundred parts, by weight, of dry commercial casein I add fifteen parts, by weight, of a suitable alkali, preferably bicarbonate of soda, and six hundred parts, by weight, of water. These ingredients should be made into a perfect solution by heating the same in a jacket kettle or hot-water bath. To the solution is then gradually added, with constant agitation, by stirring or otherwise, six thousand parts of vegetable oil, preferably cotton-seed oil, and the agitation is continued until the product assumes a smooth white appearance resembling, for example, that of cold lard.

In the practice of the above-described process a partial saponification of the product results from the chemical union of the alkali and oil; but if it be desirable to secure a partially or wholly solidified mass without the partial saponification resulting from the process just described I carefully neutralize the free alkali or very slightly acidulate the casein solution by adding thereto a weak solution of acetic acid, formic aldehyde, or other suitable acid or acid salt, this being done before the vegetable oil is added to the mixture of the casein solution and water, and when the vegetable oil in about the proportions heretofore stated has been added to this neutralized or slightly-acidulated solution in the manner hereinbefore described a perfect emulsion which closely resembles cold lard and which is uniform and stable in its composition and appearance is produced. The weak solution of formic aldehyde above referred to would be about five per cent. to ninety-five per cent. of water.

By following out the process hereinbefore described I am enabled to produce a solidified or semisolidified product suitable for many well-known uses for which lard is now employed for cooking purposes, which is practically odorless and which has very much less of a disagreeable flavor than that characteristic of cotton-seed oil and some other vegetable oils.

I do not wish to be understood as limiting my invention or discovery to the use of the exact proportions of the ingredients hereinbefore stated or to the use of bicarbonate of soda as an alkali in forming the casein solution, although bicarbonate of soda as an alkali is preferred; nor do I wish to be understood as limiting the invention or discovery to the use of cotton-seed oil for the production of my solidified or semisolidified oil, as other vegetable oils might be used instead of cotton-seed oil, although, so far as I now know, cotton-seed oil is the best vegetable oil, cost being considered, for use for the purpose indicated.

Having thus described my invention or discovery, I claim and desire to secure by Letters Patent—

1. The herein-described oleaginous compound or composition of matter, consisting of approximately seven parts of a solution of casein and sixty parts of a vegetable oil, thoroughly mixed and incorporated together, substantially as set forth.

2. The herein-described oleaginous compound or composition of matter, consisting of approximately seven parts of a solution of casein and sixty parts of cotton-seed oil, thoroughly mixed and incorporated together, substantially as set forth.

3. The herein-described process for thickening or solidifying a vegetable oil to produce an oleaginous compound, such process consisting in gradually adding, with constant agitation, to about sixty parts of the oil to be thickened or solidified, about seven parts of a solution of casein, substantially as set forth.

4. The herein-described process for thickening or solidifying cotton-seed oil to produce an oleaginous compound, such process consisting in gradually adding, with constant agitation, to about sixty parts of the oil to be thickened or solidified, about seven parts of a solution of casein, substantially as set forth.

In testimony whereof I affix my signature in presence of two witnesses.

CUSHING ADAMS.

Witnesses:
 CHAS. J. HENDERSON,
 E. R. BALL.